A. L. SESSIONS.
VEHICLE BODY SUPPORT.
APPLICATION FILED APR. 15, 1913.
1,215,878.
Patented Feb. 13, 1917.
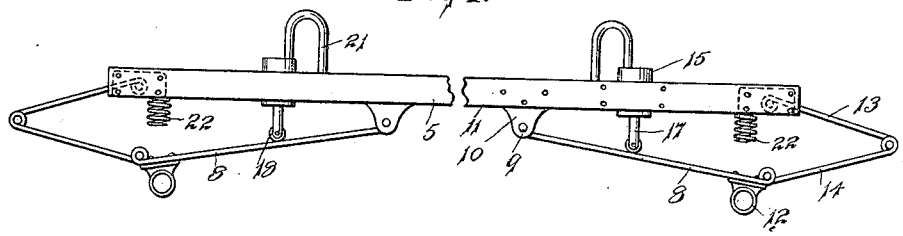
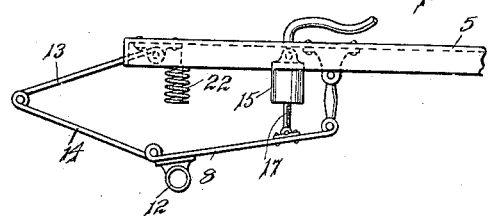
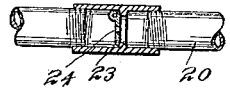
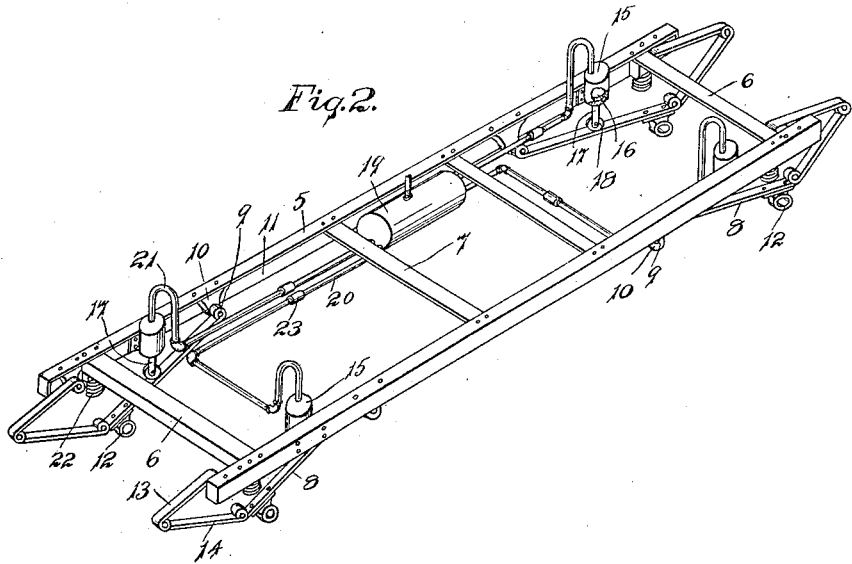
WITNESSES:
INVENTOR.
Albert L. Sessions,
BY
Arthur Jenkins
ATTORNEY.

UNITED STATES PATENT OFFICE.

ALBERT L. SESSIONS, OF BRISTOL, CONNECTICUT.

VEHICLE-BODY SUPPORT.

1,215,878. Specification of Letters Patent. Patented Feb. 13, 1917.

Application filed April 15, 1913. Serial No. 761,240.

*To all whom it may concern:*

Be it known that I, ALBERT L. SESSIONS, of Bristol, in the county of Hartford and State of Connecticut, have invented a new and Improved Vehicle-Body Support, of which the following is a specification.

My invention relates more especially to devices for yieldingly supporting the body of a vehicle upon its running gear, and an object of my invention, among others, is to provide a device of this class that shall effectively cushion the body from all shocks, jars and vibrations, incident to the running of the vehicle.

One form of device embodying my invention, and in the construction and use of which the objects herein set out, as well as others, may be attained, is illustrated in the accompanying drawings in which—

Figure 1 is a view in side elevation of the frame of a vehicle body showing my improved yielding supports in place thereon.

Fig. 2 is a perspective view of the same.

Fig. 3 is a detail view illustrating a modified form of the invention.

Fig. 4 is a detail view showing the check valve.

In the accompanying drawings the numeral 5 denotes the side bars; 6, the end bars; and 7, the cross-bars of a vehicle frame that may be of any ordinary form and construction. My improved supporting device includes an axle lever 8 pivotally connected as at 9 to the side bars 5, and preferably on the inner sides of said bars, and, as shown herein, to brackets 10 depending from a flange 11 of the side bar 5, that, in the construction herein shown, is of angle iron. An axle lever is provided for each of the wheels of the vehicle, and each of said levers has a loop or sleeve 12 for the reception of the axle upon which the wheels are mounted. Toggle or stay levers are pivotally connected at their ends, and the opposite end of the toggle lever 13 is pivotally secured to the side bar 5, while the opposite end of the lever 14 is pivotally connected to the axle lever 8.

A cylinder 15 is mounted on the frame in any suitable manner, a cylinder being provided for each of the axle levers. In the embodiment of my invention shown herein, these cylinders are secured to the side bars 5 so that their lower ends shall not project to any appreciable extent below the lower edge of the side bars. These cylinders each have a piston 16, and a piston rod 17 connected thereto, the lower end of which rod rests in engagement with one of the axle levers 8, as shown herein, an anti-friction member 18, of any suitable construction, being interposed between the end of the piston rod and the axle lever.

A pressure tank 19 is mounted on the frame in any suitable position and is connected by pipes 20—21, with each of the cylinders 15. This tank may be supplied with air under pressure in any suitable manner, and this pressure is supplied to each of the cylinders 15 in such manner as may be desired, either directly or through the medium of some other agent. In the embodiment of my invention, as herein shown, I prefer to fill, or nearly fill, each of the cylinders with some liquid, as an oil having considerable density, that may act as a lubricant for the pistons, and the pipes 21 are so constructed and located that the oil will be retained within the cylinders, or so influenced that it will flow back into the cylinder under the movements of the piston. This result may be effected in various ways, as herein shown the pipes 21 having a bend or "goose-neck" terminating at the end of a vertical rise and located at such distance from the cylinder that this vertically arranged part of the pipe will contain all of the oil that may be forced out of the cylinder by the movements of the piston.

In order to insure that the toggle levers and axle levers shall not be forced into engagement with each other, or against the side bars, should the pressure apparatus above described, for any reason, fail to work, I provide cushioning springs 22, secured in proper position to prevent such action. As herein shown, such springs are secured to the frame overlying the joint between the axle lever and the toggle lever 14, one end of the springs being free, but in position to contact with the lever 8 should the parts, for any reason, be forced together to an undue extent.

A device constructed as above described obtains all the advantages of an air cushion to resist the vibrations incident to the running of the vehicle and at the same time reduces the liability to leakage of the air to a minimum, as the air is confined to the pressure tank and connections, while the oil is employed in connection with the movable parts and is less liable to leak out of the cylinder than would be the air.

In some forms of construction it may be desirable to control the movements of the fluids and to this end I provide a check valve 23 in each of the connections between the cylinder and tank 19, this check valve yielding freely to pressure within the tank 19 but closing to pressure in the opposite direction, a port 24 being provided in this check valve to regulate the flow of air passing the check valve.

By locating the cylinders 15 at the side of the frame, and preferably at the inside of the frame, a cylinder of a longer dimension may be obtained than would be the case if the cylinders were located directly under the frame parts.

By employing a cylinder with means to resist the movement of the lever, this cylinder being located near the pivotal point of attachment of the lever to the frame, a minimum amount of movement of the piston is required to effectually resist a considerably greater amount of movement of the wheels, and the location of the cylinder is therefore much more practical than in prior constructions where the amount of movement of the piston has been considerable, the latter causing excessive wear, objectionable size, and difficulty in preventing leaking of the air.

I claim:

1. In combination with a vehicle frame, an axle lever pivotally attached thereto, a piston rod positioned to oppose movement of said lever in one direction, a piston secured to said rod, a cylinder to contain said piston, a pressure tank, and a connection between said tank and cylinder constructed to receive contents of the cylinder and prevent its flow away from the cylinder toward said tank.

2. In combination with a vehicle frame, an axle lever pivotally attached thereto, a cylinder secured to the frame, a piston located in the cylinder, a piston rod projecting from said piston in position to oppose movement of said axle lever in one direction, a pressure tank, and a connection between said tank and cylinder, said connection being constructed to prevent flow of liquid contents of the cylinder away from it toward said tank.

3. In combination with the frame of a vehicle body, an axle lever pivotally attached thereto, a cylinder supported on said frame, a piston located in said cylinder, a piston rod projecting from the piston and positioned to oppose movement of said axle lever in one direction, a pressure tank, and a connection between said cylinder and tank, said connection having a bend located above the top of the cylinder to prevent flow of liquid from the cylinder to said tank.

4. In combination with the frame of a vehicle body, an axle lever pivotally attached thereto, means upon said lever to receive an axle, a cylinder secured to the frame, a piston located in the cylinder, a piston rod projecting from said piston and slidably engaging said axle lever, a pressure tank, and a connection between said tank and said cylinder.

5. In combination with a vehicle frame, an axle lever pivotally attached thereto, a piston rod positioned to oppose movement of said lever in one direction, a piston secured to said rod, a cylinder to contain said piston, a pressure tank, and a connection between said tank and piston, said connection extending upwardly to an extent sufficient to contain the liquid contents of said cylinder and prevent its flow to said tank.

6. In combination with the frame of a vehicle body, an axle lever pivotally attached thereto and having means to receive an axle, a cylinder secured to the frame and located vertically at the side of the frame members and above the bottoms thereof, a piston located in said cylinder, and a piston rod connected with the piston and in engagement with said lever to receive the inward thrust thereof.

ALBERT L. SESSIONS.

Witnesses:
ARTHUR B. JENKINS,
E. F. EATON.

Copies of this patent may be obtained for five cents each, by addressing the "Commissioner of Patents, Washington, D. C."